United States Patent Office 2,814,379
Patented Nov. 26, 1957

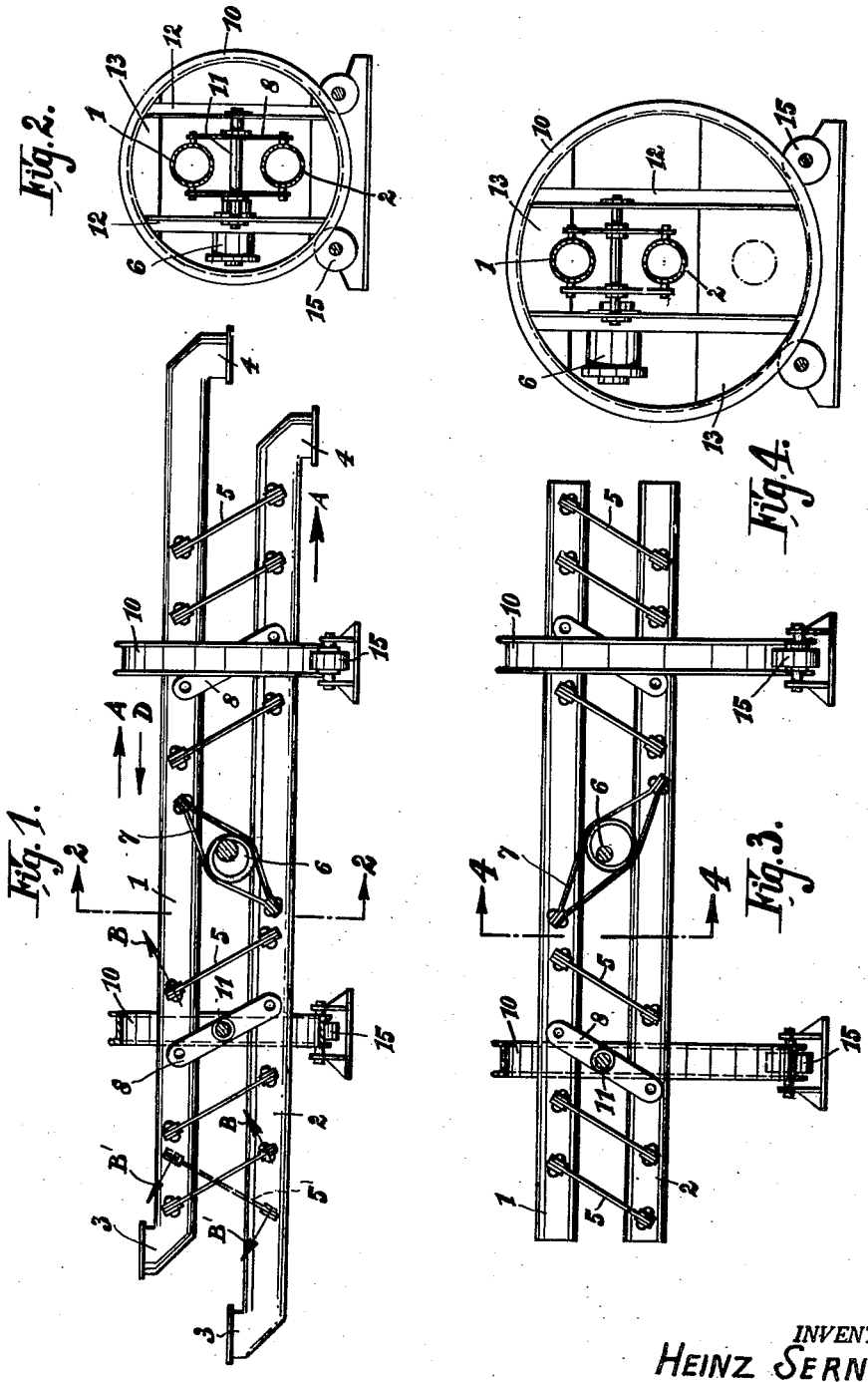

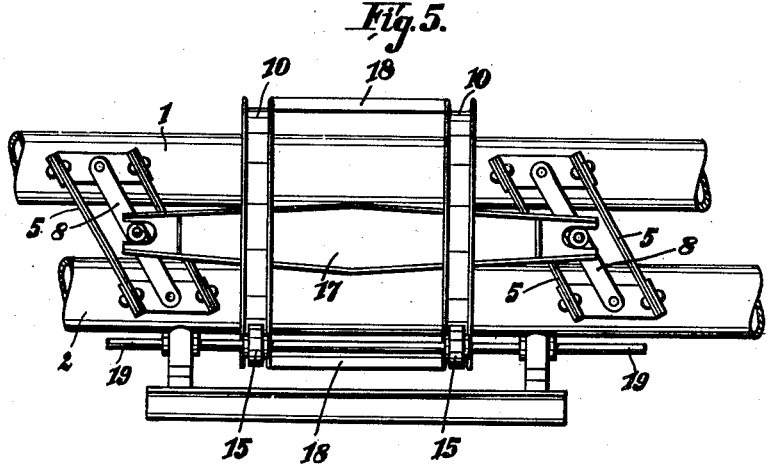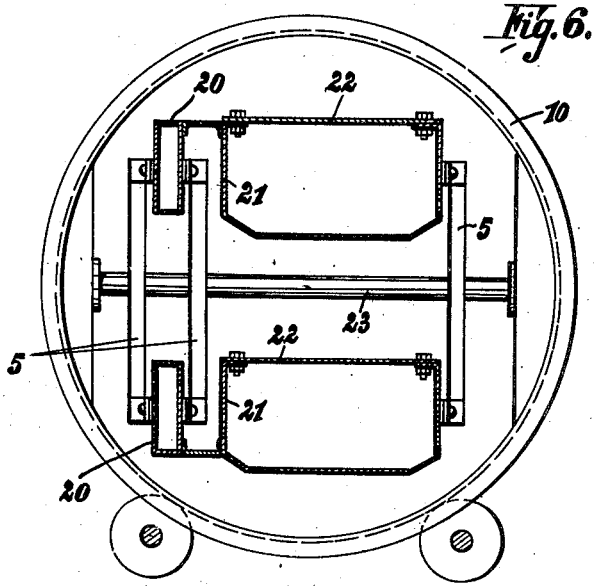

2,814,379

VIBRATORY CONVEYOR HAVING TWO OPPOSITELY VIBRATING FEED MEMBERS

Heinz Sernetz, Graz-Eggenberg, Austria

Application February 3, 1954, Serial No. 408,107

4 Claims. (Cl. 198—220)

This invention relates to a vibratory conveyor having two superimposed tubular feed members vibrating in mutually opposite senses and interconnected by springs distributed throughout their length, and suitably also by links. In most cases the feed members derive their drive motion from joint drive means. Vibratory conveyors having tubular feed members find application for the conveyance of material to be conveyed while sealed from the outside air, e. g., because the material concerned produces dust or obnoxious fumes, or because it is desired to cool the material by a stream of air conducted through the tube.

The direction of conveyance of these vibratory conveyors depends on the angle included between the two springs interconnecting the vibratory members and the vertical. That conveying action is due to the fact that the vibratory feed member intermittently throws the material to be conveyed forwardly, the form and direction of the trajectory depending on said angle. This means that with straight springs the directions of conveyance by the upper and lower feed members are identical.

In practice it is sometimes desired to rearrange a vibratory conveying trough in such a manner that it conveys selectively in one or the other direction. For instance, it is conceivable that a certain material is to be fed first from the point where it is obtained into a silo, and after some time it is to be taken from the silo in the reverse direction. In vibratory conveyors which can be moved from one place to another, e. g. on wheels, the conveyor could be reversed by turning the entire set through 180 deg. on a vertical axis. However, that procedure is very complicated and with long troughs requires much space.

It is an object of the present invention to provide a vibratory conveyor of the type initially mentioned, which can be changed from one direction of conveyance to another as desired with simple means. According to the invention this object is achieved by mounting the entire vibratory conveyor in a rotary frame permitting of a rotation of the device on a horizontal longitudinal axis, e. g. the longitudinal center line.

For a better understanding of what has been said hereinbefore and for illustrating further features of the invention, reference is to be had to the diagrammatic drawing, which shows in Figs. 1 and 3 two different embodiments of the principle of the invention whereas Figs. 2 and 4 are sections taken on lines II—II (Fig. 2) and IV—IV (Fig. 4) of Figs. 1 and 3, respectively. Figs. 5 and 6 relate to modified constructions of the rotary frames supporting the feed members on the ground. Like parts are designated with the same reference numerals in all figures.

The vibratory conveyor shown is of the balanced conveyor type wherein each of two conveyor troughs in the form of tubes are connected to the opposite ends of a spring swing system the whole of which is supported intermediate the ends of selected springs or connecting guide links and wherein each conveyor tube is simultaneously pushed or driven in opposite directions causing the guide links to swing and the springs to flex in opposite directions on opposite sides of their nodal point.

The direction of the slope of the springs relative to the conveying surface is the determining factor of the vibratory flow of material along the conveyor. If the conveying surface of each tube has the same relative position to the springs the material flows by vibration in the same direction. This is true of all cantilever spring supported conveyors. The only way to change the direction of the angle of the springs to the conveying surface is to turn the conveyor upside down and cause the material to flow in the opposite direction. It is to this end that this invention is directed.

1 designates the upper vibratory conveyor tube, 2 the lower one, with feed and discharge sockets 3 and 4, respectively. The tubes are interconnected by springs 5 and are driven by an eccentric or crank drive actuated by an electric motor and generally designated with 6. The push rods through which the drive motion is transmitted to tubes 1, 2 are designated with 7. To relieve the springs, the conveyor is supported by means of links 8 whose vibration nodes remain at rest. If the tubes 1, 2 are of equal mass, that vibration node will be about midway of the links.

According to the invention two rotary frames are provided instead of an ordinary frame for supporting the conveyor on the ground. Each of the rotary frames comprises a mount ring 10, which has mounted thereto through the intermediary of suitable stiffening members and plates 12, 13 the transverse shaft 11 supporting the links 8. The mount ring rests on rollers 15 and can be fixed in the working position desired at any time by locking means not shown. The shaft 11 is rubber-mounted in the mount rings; this is not shown in detail. Suitably the supporting rollers 15 are also given a rubber tread (not shown) vulcanized thereon.

In the position shown in Fig. 1 the two tubes 1, 2 will convey in the direction represented by arrows A because the springs 5 impart to the tubes a vibratory motion whose beginning is represented by arrows B. The return movement of the tubes opposite to those arrows has no conveying effect. When the entire conveyor is turned in the sense of arrow C, Fig. 2, through 180 deg., the springs will come into position 5' and the direction of conveyance will be reversed in accordance with the components of movement B' effective now (direction D). It is thus possible according to the invention by the simple construction of the mounting means supporting the conveyor on the foundation to reverse the direction of conveyance in a simple manner while retaining the machine support once provided. This advantage is valuable not only for stationary installations but also for mobile units, e. g., where these vibratory conveyors are used on building sites, where the rotation on a vertical central axis in most cases is not possible at all or only with difficulty owing to lack of space.

In the position shown with full lines in Fig. 1, numerals 3 designate the feed sockets of the upper and lower tubes, 4 the sockets discharging the material conveyed. Upon a rotation of the conveyor through 180 deg. the sockets will also change their position symmetrically in respect of the axis of rotation of the entire conveyor, which axis is determined by the ring mounts 10. Besides, the receiving sockets 3 now have become discharging sockets, in accordance with the changed direction of conveyance (arrow D). Any feed and discharge lines, as are frequently provided particularly in connection with stationary installations, must be adaptable to the changed position of the sockets. This causes no difficulty and can be achieved, e. g., by the use of flexible feed and discharge lines, tube branches, or the like.

The illustrative embodiment of Figs. 3 and 4 differs from the foregoing one mainly by the fact that the axis of rotation is not the axis of symmetry of the entire conveyor but the axis of one tube (the axis of the lower tube in the example shown). The ring mounting loses one degree of symmetry, which is without significance in practice. With this construction the tube 2 does not change its height as the conveyor is turned. This may be of advantage mainly with stationary installations in order to simplify the connection of the feed and discharge lines.

In both cases the tube ends may be arranged in vertical planes, as is shown in Fig. 3. Such arrangement may also simplify the connection to the said lines.

Particularly for larger distances of conveyance involving machines of large weight, the rotary frames will be constructed in practice in such a manner that each point of support has associated therewith a pair of mount rings. An example of that construction is shown in the diagrammatic Fig. 5. The latter shows the feed members 1, 2, the links 8 connecting them, and the springs 5. The links 8 are arranged in pairs at the front and rear ends (seen in the direction towards the plane of the drawing) and the links of each pair are interconnected by a crossbeam 17. Thus one such crossbeam is provided at each longitudinal side of the conveyor. These crossbeams are firmly connected in a manner not shown in detail to the two mount rings 10 united in a pair. 18 designates connecting members whereby the two rings 10 are combined in a unit. The mount rings rest on rollers 15, which for rotating the entire conveyor may be driven through the intermediary of a shaft 19.

When tubular feed members have been referred to hereinbefore, that term is not to be construed in a narrow sense since these tubes need not be of circular cross section. It is essential that the feed members have peripheral surfaces closed on all sides in order that after the rotation has been effected the material to be conveyed still finds a trough-shaped track by whose vibratory movement the conveyance is effected. Fig. 6 is an example of a somewhat different construction of the feed members. 20 are stiffening longitudinal hollow beams, whereas the feed members comprise longitudinal section members 21, engaged by the springs 5, and bottoms 22 formed by plates 22 welded to the longitudinal section members. The construction shown distinguishes by a high rigidity of the feed members. The links (not shown) are connected to crossbeams 23 supporting the conveyor on the mount rings 10. The support of the mount rings on the foundation or carrying frame is not shown in this figure; it might be arranged according to Fig. 5.

It is seen that the principle of the invention permits of numerous other constructional modifications. Though for a statically determinate mounting two ring mounts will usually be provided, their number may be increased, for instance for particularly long conveyors. It is not essential that the rotation be effected through the full angle of 180 deg.; each working position may be displaced by a small angle from the vertical for a more convenient arrangement of the four connecting lines required to the ends of the conveyor tubes; this applies more particularly to vertical tube ends according to Fig. 3. It would also be possible to attach the conveyor to the ring mounts directly by the springs 5, instead of by the links 8.

What is claimed is:

1. In combination with a vibratory conveyor comprising two superimposed tubular feed members arranged for vibration in mutually opposite senses and spring means interconnecting said feed members, support means connected to said spring means at the plane of the nodal points of said spring means, a rotary frame carrying said conveyor by said supporting means and arranged to permit of a rotation of said conveyor through about 180 deg. on a longitudinal axis of the conveyor.

2. In combination with a vibratory conveyor comprising two superimposed tubular feed members arranged for vibration in mutually opposite senses and spring means interconnecting said feed members, support means connected to said spring means at the plane of the nodal points of said spring means, a rotary frame carrying said conveyor by said supporting means and arranged to permit of a rotation of said conveyor through about 180 deg. on the longitudinal center line of the conveyor.

3. In combination with a vibratory conveyor supported on a foundation and comprising two superimposed tubular feed members arranged for vibration in mutually opposite senses, spring means and links interconnecting said feed members, and supporting members engaging said links, the provision of mount rings supporting said supporting members on said foundation and arranged to permit of a rotation of said conveyor through about 180 deg. on a longitudinal axis of the conveyor.

4. In combination with a vibratory conveyor supported on a foundation and comprising two superimposed tubular feed members arranged for vibration in mutually opposite senses, and spring means and links interconnecting said feed members, the provision of at least one pair of mount rings supported on said foundation and supporting members engaging said links and supporting each of said links on both mount rings of one of said pairs, said mount rings being arranged to permit of a rotation of said conveyor through about 180 deg. on a longitudinal axis of the conveyor.

References Cited in the file of this patent

UNITED STATES PATENTS

| 2,179,442 | Wolz | Nov. 7, 1939 |
| 2,279,742 | Overstrom et al. | Apr. 14, 1942 |

FOREIGN PATENTS

| 27,193 | Great Britain | Nov. 23, 1910 |